Patented Feb. 17, 1953

2,628,980

UNITED STATES PATENT OFFICE 2,628,980

BETA-PHENYL-GAMMA-NITROALDEHYDES

Owen A. Moe and Donald T. Warner, Minneapolis, Minn., assignors to General Mills, Inc., a corporation of Delaware No Drawing. Application February 18, 1949,
Serial No. 77,283

9 Claims. (Cl. 260—599)

The present invention relates to novel gamma-nitrobutyraldehydes having the following formula:

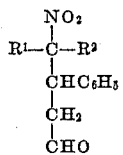

in which $R^1$ and $R^2$ are selected from the group consisting of hydrogen and low alkyl groups.

The products of the present invention are, in general, oily liquids. In view of the presence of the reactive nitro group and the aldehyde group, these compounds are particularly useful in organic synthesis, such as the synthesis of amino acids, amino alcohols, substituted indole derivatives, and the like, as will be shown more fully hereinafter.

It is therefore an object of the present invention to provide novel aldehyde compounds having the above formula.

It is a further object of the present invention to provide a novel process of preparing such compounds.

According to the present invention it has been found that various aliphatic nitro compounds react with cinnamyl aldehyde to effect 1,4 addition thereof to yield the corresponding gamma-nitrobutyraldehydes. These reactions are carried out in the presence of an alkaline catalyst such as an alkali metal alkoxide, or in the presence of certain basic materials such as tertiary amines, for example, tributylamine. With the alkali metal alkoxide catalyst, the amount of catalyst is preferably held within the range of approximately 0.001 to 0.10 mole per mole of reagent used. Variations of catalyst outside this range may be employed, but in general, when the amount of catalyst exceeds the one-tenth mole ratio, there is a tendency for side reactions which cut down the yield of the desired aldehyde, and accordingly such higher molar ratios of catalyst are not preferred. With other catalysts, such as tributylamine, the amount of catalyst is not as critical and it is possible to use much larger quantities of catalyst up to equimolar proportions.

The reaction is carried out in the presence of a suitable solvent diluent which does not enter into the reaction. Almost any solvent diluent which meets this test may be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal to the volume of the ester employed. In general, the larger the quantity of solvent, the easier it is to control the reaction in the desired direction. It is apparent that the quantity of solvent employed is limited by the problem of recovering the solvent.

The temperature employed during the addition reaction is subject to considerable change. Usually a temperature within the range of 0–50° C. is desirable. At temperatures above 50° C. there is some possibility of side reactions.

In carrying out the reaction it is preferred to prepare a solution of the nitro paraffin in the solvent and to add the catalyst to this solution. The resultant solution is then cooled to a suitable temperature for reaction and the unsaturated aldehyde is added slowly to the solution over an extended period of time. In this way it is possible to control the temperature of the reaction mixture very readily to within the desired range, and thus to control the reaction in the desired direction. After the reaction has been completed, the catalyst may be neutralized and the product worked up in a conventional manner.

While the specific examples herein described are with particular reference to 1-nitropropane and 2-nitropropane, it is understood that other nitro compounds such as nitromethane, nitroethane, and nitrobutane, may be used. In general, nitro paraffins which produce compounds having the general formula given herein in which $R^1$ and $R^2$ are low alkyl groups containing from one to four carbon atoms, may be used.

The following examples will serve to illustrate the invention:

Example 1

Absolute ethanol (80 ml.) was reacted with 0.1 g. of sodium and the resulting sodium ethoxide solution was mixed with 22.3 g. of 2-nitropropane. The reaction mixture (at 25° C.) was treated with cinnamyl aldehyde (33 g.) and the resulting solution was allowed to stand for 16 hours at room temperature. The catalyst was then neutralized by the addition of 0.8 g. of glacial acetic acid and the neutralized solution was concentrated in vacuo to yield gamma-nitro-gamma-methyl-beta-phenylpentanal as a residual oil. This residual oil was dissolved in benzene (200 ml.) and washed with four 50 ml. portions of water. The benzene layer was dried over anhydrous sodium sulfate and after removal of the benzene by vacuum distillation, the residual oil was distilled. The product was collected in two fractions boiling at 118–128° C. (0.26 mm.) $n_D^{25}=1.5310$, and 128–

138° C. (0.26 mm.) $n_D^{25}=1.5298$. The two fractions were then recombined and subjected to an additional distillation. The purified material boiled at 111.5–112.5° C. (0.2 mm.) $n_D^{25}=1.5299$. A portion of the redistilled product was treated with 2,4-dinitrophenylhydrazine in a conventional manner, and the 2,4-dinitrophenylhydrazone of gamma-nitro-gamma-methyl-beta-phenylpentanal was obtained as a crystalline product melting at 181–182° C.

*Example 2*

Absolute ethanol (75 ml.) was reacted with 0.06 g. of sodium and the resulting sodium ethoxide solution was mixed with 22.3 g. of 1-nitropropane. This reaction mixture at a temperature of 26° C., was treated with 30.5 g. of cinnamyl aldehyde and the reaction temperature was observed to increase to 40° C. over a 15-minute period. The reaction was allowed to proceed for an additional 1½ hours and the catalyst was neutralized with 0.7 g. of glacial acetic acid. The neutralized solution was concentrated in vacuo and the residual oil was dissolved in 170 ml. benzene and washed with four 50 ml. portions of water. The benzene layer was dried over anhydrous sodium sulfate. The solvent was removed in vacuo and the residual oil was distilled. Gamma-nitro-beta-phenylhexanal was collected at 135–182° C. (0.3–0.8 mm.). This crude product was redistilled and a center fraction, boiling at 120–125° C. (0.4–0.45 mm.) $n_D^{25}=1.5280$, was taken for the preparation of a derivative. This center fraction was treated with 2,4-dinitrophenylhydrazine in the usual manner and the 2,4-dinitrophenylhydrazone of gamma-nitro-beta-phenylhexanal melted at 204–204.5° C. dec. after recrystallization from an ethanol-ethyl acetate solvent mixture.

Compounds of the type disclosed in the present invention may be converted into new and novel indole derivatives as shown below:

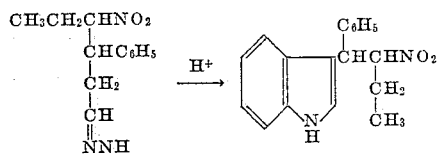

The nitrobutyraldehydes may be employed in the synthesis of new hydantoins in the following manner:

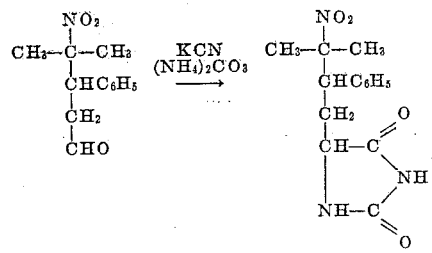

The synthesis of interesting organic intermediates may be accomplished by the simultaneous condensation-reduction of the aldehyde compound with ethyl cyanoacetate:

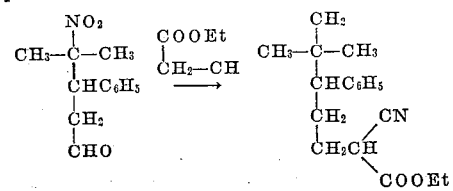

Conversion of the carbonyl group to the carboxyl group and conversion of the nitro group to an amino group results in new and interesting amino acids:

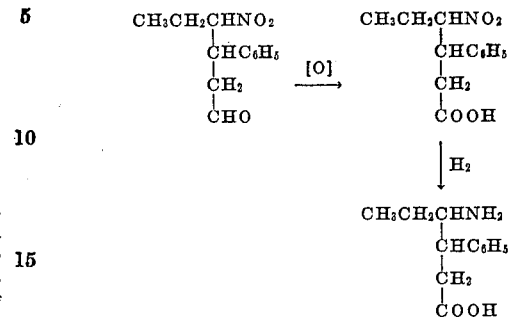

Amino alcohols may be produced by reduction of the carbonyl and the nitro groups as indicated in the following reaction:

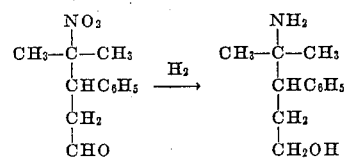

While various modifications of the invention have been described, it is to be understood that the invention is not limited thereto, but that other variations are possible without departing from the spirit thereof.

We claim as our invention:

1. Nitroaldehydes having the following formula:

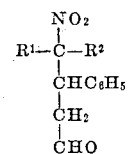

in which $R^1$ and $R^2$ are selected from the group consisting of hydrogen and low alkyl groups.

2. Nitroaldehydes having the following formula:

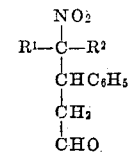

in which $R^1$ and $R^2$ are low alkyl groups.

3. Nitroaldehydes having the following formula:

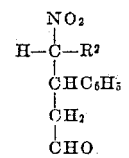

in which $R^2$ is a low alkyl group.

4. Beta-phenyl-gamma-nitrohexanal.

5. Beta-phenyl-gamma-nitro-gamma-methylpentanal.

6. Process of producing aldehyde compounds having the following formula:

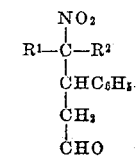

in which $R^1$ and $R^2$ are selected from the group consisting of hydrogen and low alkyl groups, which comprises reacting cinnamyl aldehyde with a substantially equi-molecular quantity of a nitro paraffin having the formula

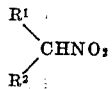

in the presence of an alkaline catalyst.

7. Process of preparing nitroaldehydes having the following formula:

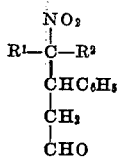

in which $R^1$ and $R^2$ are selected from the group consisting of hydrogen and low alkyl groups, which comprises preparing a solution of a substantially equi-molecular quantity of a nitro paraffin having the following formula

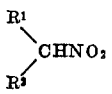

in an inert solvent together with an alkaline catalyst, gradually adding cinnamyl aldehyde thereto, and maintaining the temperature of the reaction mixture not substantially in excess of 50° C.

8. Process of preparing beta-phenyl-gamma-methyl-gamma-nitropentanal which comprises preparing a solution of 2-nitropropane in absolute ethanol, said solution containing an alkaline catalyst, gradually adding a substantially equi-molecular quantity of cinnamyl aldehyde thereto, and maintaining the temperature of the reaction mixture at not substantially in excess of 50° C.

9. Process of preparing beta-phenyl-gamma-nitrohexanal which comprises preparing a solution of 1-nitropropane and an alkaline catalyst in absolute ethanol, gradually adding a substantially equi-molecular quantity of cinnamyl aldehyde thereto, and maintaining the temperature of the reaction mixture at not substantially in excess of 50° C.

OWEN A. MOE.
DONALD T. WARNER.

REFERENCES CITED

The following references are of record in the file of this patent:

UNITED STATES PATENTS

| Number | Name | Date |
| --- | --- | --- |
| 2,332,482 | Degering et al. | Oct. 19, 1943 |
| 2,355,402 | Sussman | Aug. 8, 1944 |
| 2,475,996 | Smith | July 12, 1949 |

OTHER REFERENCES

Kohler: J. A. C. S., vol. 38, pages 889–900 (1916).

Hass et al.: Chem. Rev. (3), vol. 32, pages 416 and 417 (1943).

Fort et al.: J. Chem. Soc. (London), 1948, pages 1907–19.